United States Patent [19]

Weber

[11] Patent Number: 5,213,342
[45] Date of Patent: May 25, 1993

[54] LIP SEAL WITH RADIALLY COMPRESSIBLE SUPPORT BAND

[75] Inventor: Charles F. Weber, Delphos, Ohio

[73] Assignee: Federal-Mogul Corporation, Southfield, Mich.

[21] Appl. No.: 837,501

[22] Filed: Feb. 18, 1992

[51] Int. Cl.[5] .............................................. F16J 15/32
[52] U.S. Cl. .................................... 277/152; 277/157; 384/485; 267/1.5
[58] Field of Search .................. 277/9, 138, 151, 152, 277/157, 158, 160, 161, 164, 215; 384/148, 484-486; 267/1.5

[56] References Cited

U.S. PATENT DOCUMENTS

| | | | |
|---|---|---|---|
| 1,582,562 | 4/1926 | Vogel | 277/152 |
| 2,521,145 | 9/1950 | Blake et al. | 277/152 |
| 2,594,164 | 4/1952 | Hedberg | 267/1.5 |
| 2,891,831 | 6/1959 | Baker | 277/160 |
| 3,837,631 | 9/1974 | Evans et al. | 267/1.5 |
| 4,133,542 | 1/1979 | Janian et al. | 277/164 X |
| 4,508,356 | 4/1985 | Janian | 277/164 X |
| 4,626,002 | 12/1986 | Hagemeister et al. | 277/151 X |
| 5,118,206 | 6/1992 | Otto et al. | 384/484 X |

FOREIGN PATENT DOCUMENTS

| | | | |
|---|---|---|---|
| 992261 | 10/1951 | France | 277/161 |
| 9110088 | 7/1991 | PCT Int'l Appl. | 277/158 |

*Primary Examiner*—William A. Cuchlinski, Jr.
*Assistant Examiner*—Scott W. Cummings
*Attorney, Agent, or Firm*—Lawrence J. Shurupoff

[57] ABSTRACT

A seal assembly includes an annular elastomeric seal element, and a resilient annular reinforcing element nested within the elastomeric element to exert a radial biasing force that increases the effective sealing force even in the presence of shrinkage, wear or loss of elasticity in the elastomeric element. The reinforcing element preferably is a spring steel band having a sinuous circumferential configuration so that the band can expand or contract to exert a desired force on the elastomeric element and can expand or contract to facilitate its installation in certain applications.

6 Claims, 2 Drawing Sheets

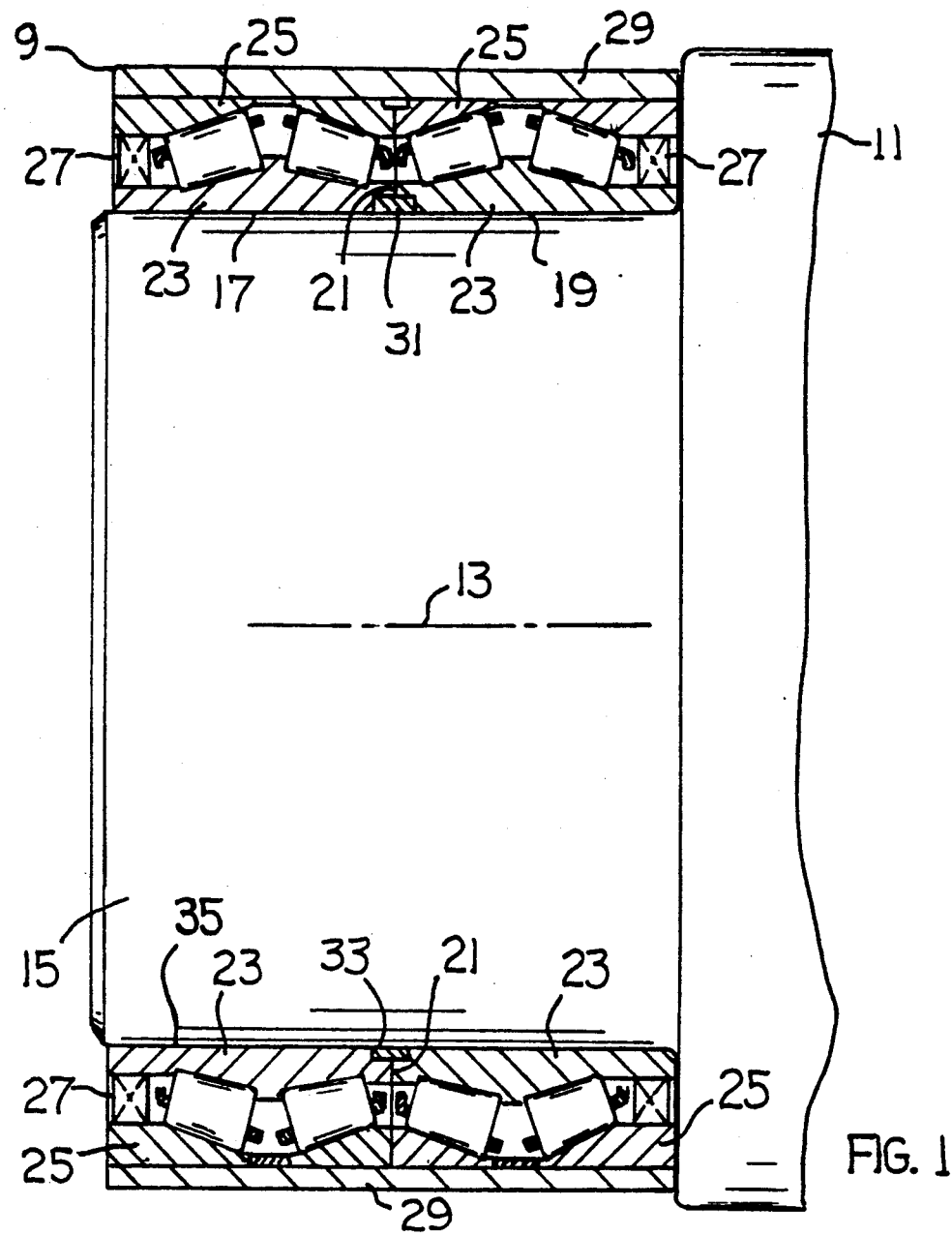
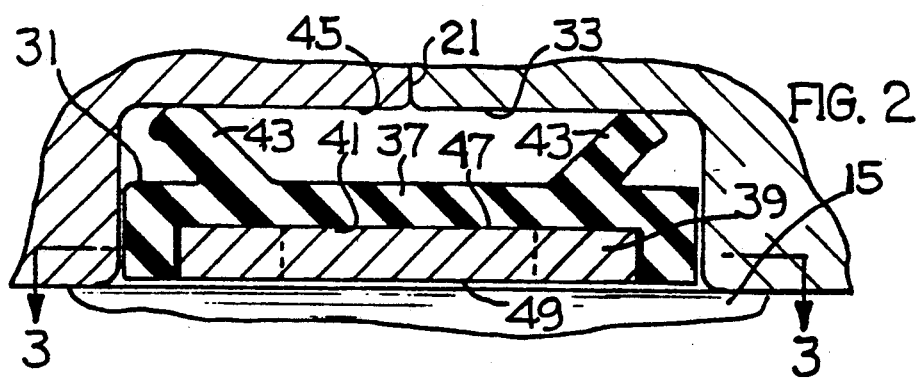
FIG. 1
FIG. 2

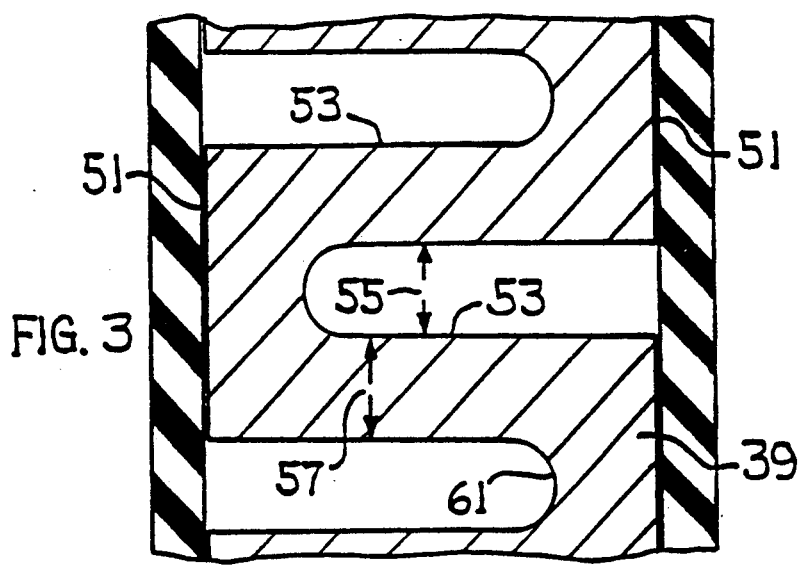
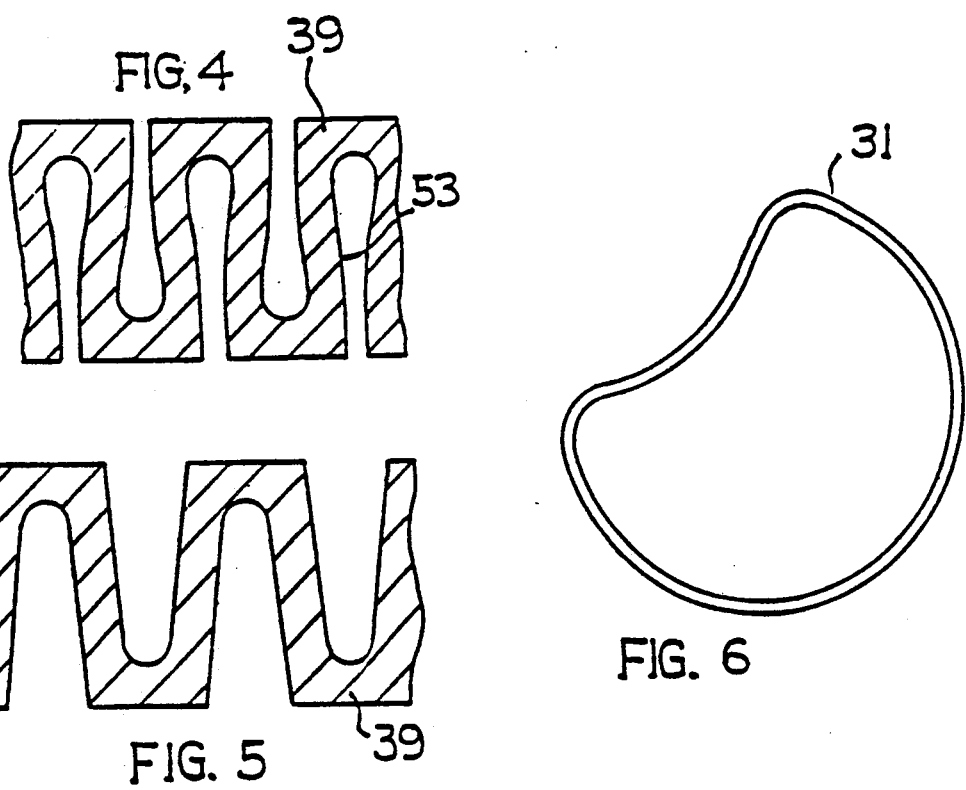

LIP SEAL WITH RADIALLY COMPRESSIBLE SUPPORT BAND

BACKGROUND OF THE INVENTION

Field of the Invention

This invention relates in general to annular resilient seals such as used to prevent contaminants from entering into anti-friction bearings and particularly to a radially compressible hoop for providing radial support to such seals.

Description of Prior Developments

In some steel-making facilities hot steel ingots are moved between one or more pairs of transversely extending rollers which work or shape the ingots to their finished thickness and sectional configuration. The individual rollers are spaced slightly apart on substantially horizontal axes extending transverse to the motion path of the ingots.

Each roller is supported by a stub shaft at each of its opposite ends. Each stub shaft is supported in anti-friction bearings that are arranged in pillow block housings. The stub shaft may have a diameter of about nineteen inches in which case the axial length of the associated anti-friction bearing may be about thirteen inches. Each bearing includes an inner race having a press-fit on its associated stub shaft. The outer race of each bearing is seated within an associated pillow block housing.

Due to the large dimensions of the bearings, each bearing is usually divided into two annular half sections. Each half section is formed as an annulus about six and one-half inches long, and may contain two rows of anti-friction rollers. The bearing half sections are individually press fit axially onto the associated shaft in an end-to-end relationship. Due to the split or two-piece nature of the bearings, there is an annular joint formed between the abutting ends of the bearing half sections.

The annular interface between each stub shaft and the associated bearing inner race is sealed against entry of dirt by reason of the press fit between the shaft and inner race bore surface. Additional sealing is provided by a static annular seal which is located within an annular channel located at the annular abutment joint between the bearing half sections.

It has been found that airborne dirt particles as well as dirt particles mixed with water can migrate through the press fit seal and through the backup seal during steel making operations. The migrating dirt can work itself into the interior spaces within the bearing to deposit run the roller bearing surfaces, thereby shortening the bearing service life by a grinding action on the roller surfaces. In order to provide for a more effective backup seal, a split resilient hoop had been considered to provide radial support for the backup seal.

Unfortunately, the split in the hoop decreases the hoop's radial support to a point where the hoop is believed to be ineffective. The split is required to allow the annular backup seal to be radially compressed during assembly so that it can fit within the bore of the inner bearing race and subsequently radially expand outwardly to force the seal against and across the joint between the bearing half sections.

Thus, a need exists for a seal which may be radially compressed during its assembly into a split bearing or the like and which will subsequently radially expand with sufficient force to form and maintain an effective seal.

SUMMARY OF THE INVENTION

The present invention concerns an improved annular static seal assembly that can be used as a primary and/or back-up seal in the above-described shaft-seal environment. This seal assembly can be used in other applications, either as a static seal or as a rotating seal which forms a seal between a stationary structure and a rotating structure.

The seal of the present invention can be formed as a two piece assembly that includes an outer annular elastomeric sealing element and an inner annular resilient reinforcement element compressively detachably retained within the elastomeric sealing element. Alternatively, the elastomeric sealing element may be permanently molded around the reinforcement element. The resilient reinforcement element exerts an outwardly directed radial force on the annular sealing element such that the sealing element is pressed against an associated sealing surface of the structure that requires sealing.

Should the elastomeric sealing element shrink, wear or lose its elasticity, due for example to the effects of a high temperature environment, the resilient reinforcement element will nevertheless continue to exert an outwardly radiating force on the sealing element, such that the effects of the shrinkage, wear or lack of elasticity are largely compensated or overcome. The force of the resilient reinforcement element on the sealing element will physically deform the sealing element outwardly so that it continues to maintain its seal with the associated structural component, e.g. the bore surface of a bearing race or bearing cone.

In one specific form of the invention, the two piece seal assembly is arranged within an annular groove formed at a joint between two abutting anti-friction bearing race or cone members that are press fit on a shaft. The seal assembly forms a static seal at the joint between the two abutting static race members, such that contaminants are prevented from migrating along the shaft surface and through the joint between the two abutting race members.

The seal assembly is formed so that the resilient reinforcement element exerts substantially the same resilient radial force on the annular sealing elements at all points around the inner surface of the sealing element. There are virtually no points along the sealing element inner surface where the resilient force is substantially less than the force at other points along the sealing element inner surface.

Because of the relative uniformity of the resilient reinforcement force around the sealing element inner periphery, the sealing element provides satisfactory pressure contact with the surrounding structure at all points along the sealing element peripheral surface. Any discontinuity in the sealing pressure could lead to seal leakage.

In a preferred practice of the invention, the two piece seal assembly is formed as a unitary deformable flexible annulus capable of being reconfigured into a non-circular configuration for ease in installing the seal assembly into an internal annular groove in an associated structural element, e.g., a groove formed in the inner annular surfaces of two abutting race elements. The flexibility of the seal element annulus enables localized sections of the annulus to be effectively deformed or radially inturned to a relatively small diameter, and to be subsequently expanded to a larger diameter when such sections become axially and radially aligned with the associated mounting groove.

The desired installation flexibility or compressibility of the sealing element assembly is achieved without loss of its resilient outwardly directed biasing action on the elastomeric sealing element. During use, the annular reinforcement element is a relatively rigid but resilient structure exerting substantial outwardly-acting radial forces on the associated annular sealing element.

Within the broader scope of the invention the resilient annular reinforcement element can be arranged to exert an inward radial squeeze force on the associated elastomeric sealing element. In such an arrangement the reinforcement element would be located in surrounding relationship to the sealing element and the inner annular surface of the sealing element would act as the seal surface. This arrangement would be applicable as a shaft seal, e.g. to seal the joint between a stationary housing and a rotating shaft.

THE DRAWINGS

FIG. 1 is a fragmentary sectional view taken through a shaft and support bearing structure having a seal constructed in accordance with the present invention installed therein. The shaft may be part of a rolling mill system for working and shaping hot steel ingots in a steel making facility.

FIG. 2 is an enlarged fragmentary sectional view of the seal used in FIG. 1.

FIG. 3 is a fragmentary view taken on line 3—3 in FIG. 2.

FIGS. 4 and 5 are fragmentary views taken in the same directions as FIG. 3, but on a smaller scale, and showing the structure in different conditions of pressurization.

FIG. 6 is an elevational view of the annular seal element used in FIG. 1, but with the seal element in a detached condition and radially deformed into a shape which allows its insertion into a bore having a diameter less than that of the seal in its unstressed circular or undeformed shape.

DETAILED DESCRIPTION OF A PREFERRED EMBODIMENT OF THE INVENTION

FIG. 1 shows a bearing system 9 for supporting one end of a roller 11 having a horizontal rotational support axis 13. The roller includes a stub shaft 15 extending axially into the bearing support system 9. A similar stub shaft and bearing support structure is provided at the opposite non-illustrated end of roller 11. Roller 11 can form, for example, part of a rolling mill system for working and shaping hot steel ingots in a steel-making facility.

The illustrated bearing support structure includes two individual anti-friction bearing units 17 and 19 having an axial abutment interface or joint 21 therebetween. The bearing units have inner races that are press fit onto shaft 15 to support the rotary shaft. The two bearing units jointly support the shaft for rotation around axis 13.

Each anti-friction bearing unit includes an inner race 23, an outer race 25 and two rows of anti-friction roller bearings located between the races. An end seal 27 is provided at the outer end of each bearing unit to prevent entry of dirt or contaminants into the associated bearing unit. The outer races of the bearing units are received in a pillow block housing referenced generally by numeral 29. The housing is commonly a split construction forming two semi-cylindrical seats for the outer races of the bearing units.

The present invention is particularly concerned with an annular seal assembly 31 locatable in an annular groove formed at the abutment interface between bearing units 17 and 19. Due to the scale of the drawings, the cross-sectional configuration of seal assembly 31 is not apparent in FIG. 1.

Seal assembly 31 is better shown as enlarged in sectional FIGS. 2 and 3. In one application, shaft 15 may have a diameter of about nineteen inches while the radial cross sectional dimension of seal assembly 31 measures about 0.2 inch. In general, the diameter of shaft 15 may vary greatly from one application to the next.

Referring to FIGS. 1 and 2, there is shown an annular groove 33 formed in the inner annular surfaces 35 of races 23 of the axially aligned bearing units. The groove is defined by two similarly sized grooves machined into the abutting end faces of the race members. The defined annular groove is concentric with support axis 13 (FIG. 1).

Disposed within groove 33 is a seal assembly that includes a radially outer annular elastomeric sealing element 37 and a radially inner annular resilient reinforcement element 39. Sealing element 37 can be formed of rubber or non-rigid plastic material such as polytetrafluoroethylane which is resistant to the degrading effects of high operating temperatures.

The sealing element has a relatively wide flat annular groove 41 formed in its radially inner surface for accommodating the resilient reinforcement element 39. Groove 41 serves as a retaining channel for preventing axial displacement of element 39 out of the seal element radial plane, especially while the two piece seal assembly is being handled during its installation into groove 33.

Sealing element 37 has two circumferentially-extending lips 43 designed to have sealing contact with the concave cylindrical surface 45 of groove 33, thereby preventing small contaminants from moving from the groove into interface 21. Shaft 15 has a press fit with each inner race 23, so theoretically there is no clear path for contaminants to reach groove 33. However, it has been found that in some steel making facilities small airborne particles as well as particles carried by the water used in the rolling process can migrate along the shaft surface to reach interface 21. The two-piece seal assembly is designed to prevent such particulates from reaching interface 21.

Reinforcement element 39 is preferably formed out of a flat steel band curled or rolled into a circular hoop configuration. The ends of the band may be connected by, for example, a butt weld to form an endless circular band structure. The steel band has an outer convex surface 47, an inner concave surface 49, and two side edge surfaces 51.

The radial thickness dimension of the band, as defined between surfaces 47 and 49 may measure about 0.07 inch for the roller application noted previously. The axial width dimension of the band, as measured by the axial spacing between side edge surfaces 51 may be about .6 inch. These measurements can be varied, depending on the support action required of annular element 39.

The function of annular element 39 is to exert an outwardly-directed resilient biasing force on the associated elastomeric sealing element 37, whereby the sealing element lips 43 continue to have pressure contact with surface 45 even though sealing element 37 might, over time, shrink, wear or lose some of its elasticity. Element 39 exerts a continual outward radial pressure against the inner surface of sealing element 37. This pressure is relatively uniform in all radial directions so that all sections of each lip 43 have even and continuous pressure contact with cylindrical surface 45.

It can be seen in FIG. 2 that reinforcement element 39 is spaced a slight distance from the surface of shaft 15. The radial support action of element 39 is not dependent on any back up action by shaft 15. Element 39 exerts a resilient radially directed biasing force on sealing element 37 by reason of the fact that resilient element 39 is compressed radially and circumferentially during its initial assembly into sealing element 37. Such compression of resilient element 39 provides a supplemental sealing force that can be utilized to supplement the force derived by deflection of the sealing lips 43 as they contact cylindrical surface 45.

As seen in FIG. 3, reinforcement element 39 has a series of regularly spaced slots 53 extending from one side edge 51 of element 39 part way toward the other side edge. The slots are circumferentially spaced and staggered so that successive slots extend alternately from different ones of side edges 51 in an alternating pattern, i.e. one slot extends from the right edge, and the next adjacent slot extends from the left edge, and so on.

The entire circumferential dimension of band element 39 may be slotted. The alternating slots give the band element a generally sinuous configuration in the circumferential dimension so that the band element can expand or contract in the circumferential direction without change in its radial thickness (as seen in FIG. 2).

FIG. 3 shows the sinuous band in an intermediate condition, i.e. neither expanded nor contracted. FIG. 4 shows in an exaggerated fashion the band element in a circumferentially contracted condition wherein the slot walls are moved toward each other to decrease the spacing between adjacent slots. FIG. 5 shows the band element in a circumferentially expanded condition wherein the slots are more widely spaced as compared to the FIG. 3 condition.

Slots 51 preferably extend more than one half the width dimension of band element 39. As shown in FIG. 3, the slots extend approximately seventy five percent of the band element width dimension, although a variation in slot length can be used while still practicing the invention. The width dimension 55 of each slot may be approximately the same as the distance dimension 57 between adjacent slots.

Dimensions 55 and 57 may be about 0.12 inch for the example described above in order to give the steel band a good relation between circumferential deflection and spring force. The blind end surface 61 of each slot is preferably semi-circular, as shown in FIG. 3.

The illustrated steel band 39 can contract and/or expand circumferentially to assume different overall diameters. Band 39 is preferably formed out of a single piece of spring steel, rather than a multiplicity of separate articulated sections.

Steel band 39 may be installed into the associated sealing element 37 prior to assembly of the seal assembly 31 into groove 33. Alternatively, the steel band 39 may be installed into the sealing element 37 after the sealing element 37 has been installed within groove 33.

In its as-formed state, the steel band 39 has an outer diameter that is greater than the inner diameter of sealing element 37 as measured diametrically across groove 41. The band can be formed with straight-sided slits, as shown in FIG. 3, or with divergent slots as shown in FIG. 5.

The band is installed into element 37 by circumferentially compressing band element 39 toward the FIG. 4 condition and then inserting the band element 39 into groove 41 of element 37. It is thus possible to apply an initial compressive force to element 39, such that element 39 exerts a resilient radially outward biasing force on element 37 when the two piece sealing assembly is subsequently placed and released into groove 41.

Band element 39 is relatively rigid when it is operatively located between shaft 15 and sealing element 37. However, element 39 has some flexibility when it is in a detached or uninstalled condition nested within element 37. FIG. 6 shows the two piece seal assembly 31 in a state of flexure, to facilitate its ready insertion into groove 33. With the shaft not yet press fit into the bearing assembly, the seal assembly can be manipulated into the bore of race 23 and snapped radially outwardly into groove 33 without difficulty.

The resilience of band 39 holds the seal assembly firmly in groove 33 while the shaft is being press fit into the bearing system. If the band 39 was fully slit in the manner of a typical piston ring, it could not provide adequate biasing force to sealing element 37 once the sealing assembly 31 was installed in groove 33. The slit would allow the ends of the band to circumferentially slide and overlap during loading thereby decreasing the biasing force of the band.

The dimensions and materials for reinforcement element 39 can be varied to meet different seal element support requirements. By increasing the radial thickness dimension or axial width dimension of the steel band it is possible to increase the resilient spring force generated by the reinforcement element. The spring force can be adjusted by changing the width, depth and spacing of the slots 53.

The generated spring force can also be increased by increasing the circumferential compression of the annular element, i.e. by increasing the difference between the as-formed circumferential length of band 39 and the circumferential length of the associated groove 41 bottom surface. Circumferential compression of band 39 is preferably about one to ten percent of the initial circumferential length of the band.

In a preferred practice of the invention, the outer radial surface of element 39 is in facial contact with as great a percentage of the groove 41 bottom surface as possible in order to maximize the area of the elastomer subjected to the resilient expansion force. Therefore, element 39 is preferably formed out of a flat steel band, i.e. a steel strip having flat major faces. The width dimension of element 39 between edges 51 is preferably much greater than the band element radial thickness dimension. Typically the radial thickness dimension will be less than fifteen percent of the radial width dimension.

The drawings show a seal assembly wherein resilient band 39 exerts an outward radial force on the associated elastomeric sealing element. However, arrangements could be devised wherein the resilient band surrounds the elastomeric sealing element to exert a radial squeezing force thereon. The inner flange areas of the elastomeric element could be used as seal surfaces engageable with a shaft surface.

The drawings show a specific environment and seal construction. However it will be appreciated that the invention could be practiced in various forms and configurations.

What is claimed is:

1. An annular seal assembly comprising an annular sealing element having an annular inner surface portion and a continuous annular sealing lip; and an annular resilient reinforcement element for radially biasing said sealing element into engagement with a sealing surface; said reinforcement element being formed from a flat steel band curled into a circular configuration with its ends connected together to form an endless circular reinforcement element having a radial thickness dimension, an axial width dimension, and a circumferential dimension; said reinforcement element having a circumferentially extending sinuous configuration and comprising an outer annular surface engaged with said sealing element, an inner annular surface, and two sides surfaces interconnecting said outer and inner surfaces; said reinforcement element having circumferentially spaced slots formed through said flat steel band and extending from one side surface more than half way toward the other side surface; said slots being staggered so that successive slots extend from different ones of said side surfaces of said reinforcement element to give said reinforcement element said sinuous configuration; wherein said reinforcement element and said slots are circumferentially compressed within said sealing element so that the circumferential length of said compressed reinforcement element is substantially less than the circumferential length of said reinforcement element in its initial as-formed state and wherein said reinforcement element exerts substantially the same resilient radial force at all points around said annular sealing element.

2. The seal assembly of claim 1, wherein the change in circumferential length of the reinforcement element due to its compression within the sealing element is approximately one to ten percent of its initial length.

3. The seal assembly of claim 1, wherein said reinforcement element is formed of spring steel.

4. The seal assembly of claim 1, wherein the radial thickness dimension of the circular steel band is appreciably less than the axial width dimension.

5. The seal assembly of claim 4, wherein the radial thickness dimension of the band is less than fifteen percent of the axial width dimension.

6. The seal assembly of claim 1, wherein said annular sealing element is molded around said reinforcement element.

* * * * *

UNITED STATES PATENT AND TRADEMARK OFFICE
CERTIFICATE OF CORRECTION

PATENT NO. : 5,213,342
DATED : May 25, 1993
INVENTOR(S) : Charles F. Weber

It is certified that error appears in the above-identified patent and that said Letters Patent is hereby corrected as shown below:

Column 1, line 52, "run" should read --on--

Column 6, line 23, "pres" should read --press--

Signed and Sealed this

Twenty-first Day of December, 1993

Attest:

BRUCE LEHMAN

Attesting Officer     Commissioner of Patents and Trademarks